United States Patent
Steelberg et al.

(10) Patent No.: US 11,790,540 B2
(45) Date of Patent: Oct. 17, 2023

(54) OBJECT TRACKING AND REDACTION

(71) Applicant: VERITONE, INC., Costa Mesa, CA (US)

(72) Inventors: Chad Steelberg, Costa Mesa, CA (US); Lauren Blackburn, Costa, CA (US)

(73) Assignee: VERITONE, INC., Irvine, CA (US)

( * ) Notice: Subject to any disclaimer, the term of this patent is extended or adjusted under 35 U.S.C. 154(b) by 218 days.

(21) Appl. No.: 16/865,288

(22) Filed: May 1, 2020

(65) Prior Publication Data

US 2020/0388030 A1     Dec. 10, 2020

Related U.S. Application Data

(60) Provisional application No. 62/843,256, filed on May 3, 2019.

(51) Int. Cl.
  *G06T 7/246*  (2017.01)
  *G06T 7/00*  (2017.01)
  (Continued)

(52) U.S. Cl.
  CPC ............... *G06T 7/248* (2017.01); *G06N 3/02* (2013.01); *G06T 7/0012* (2013.01); *G06V 10/762* (2022.01); *G06V 10/764* (2022.01); *G06V 10/82* (2022.01); *G06V 20/41* (2022.01); *G06V 20/46* (2022.01); *G06V 40/161* (2022.01);
  (Continued)

(58) Field of Classification Search
  None
  See application file for complete search history.

(56) References Cited

U.S. PATENT DOCUMENTS

| | | | |
|---|---|---|---|
| 9,922,271 B2 * | 3/2018 | Kant | G06V 20/52 |
| 2010/0296702 A1 * | 11/2010 | Hu | G06K 9/6256 |
| | | | 382/103 |

(Continued)

FOREIGN PATENT DOCUMENTS

| | | | |
|---|---|---|---|
| WO | WO 2019/050508 A1 | 3/2019 | |
| WO | WO2019050508 A1 * | 3/2019 | G06F 17/30 |

OTHER PUBLICATIONS

WO, PCT/US20/31200 ISR and Written Opinion, dated Jul. 24, 2020.

(Continued)

*Primary Examiner* — Leon Viet Q Nguyen
(74) *Attorney, Agent, or Firm* — One LLP

(57) ABSTRACT

Disclosed are systems and methods to detect and track an object across frames of a video. One of the disclosed methods includes: detecting a first group of one or more objects, using a first neural network, in each frame of the video, wherein each detected head of the first group comprises a leading and a trailing edge; grouping the leading and trailing edges of the one or more objects into groups of leading edges and groups of trailing edges based at least on coordinates of the leading and trailing edges; generating a list of no-edge-detect frames by identifying frames of the video missing a group of leading edges or a group of trailing edges; analyzing the no-edge-detect frames in the list of no-edge-detect frames, using an optical image classification engine, to detect a second group of one or more objects in the no-edge-detect frames; and merging the first and second groups of one or more objects to form a merged list of detected objects in the video.

20 Claims, 14 Drawing Sheets

(51) Int. Cl.
    *G06N 3/02*     (2006.01)
    *G06V 20/40*     (2022.01)
    *G06V 10/762*     (2022.01)
    *G06V 10/764*     (2022.01)
    *G06V 10/82*     (2022.01)
    *G06V 40/16*     (2022.01)

(52) U.S. Cl.
    CPC .............. *G06T 2207/10016* (2013.01); *G06T 2207/20084* (2013.01); *G06T 2207/30196* (2013.01)

(56) References Cited

U.S. PATENT DOCUMENTS

| | | | |
|---|---|---|---|
| 2012/0251078 A1* | 10/2012 | Leichter | G06V 40/173 |
| | | | 386/E5.028 |
| 2018/0268240 A1 | 9/2018 | Loce et al. | |
| 2018/0322750 A1* | 11/2018 | Venetianer | G08B 13/19604 |
| 2019/0034734 A1* | 1/2019 | Yen | G06T 3/4046 |
| 2019/0050678 A1 | 2/2019 | Shen et al. | |
| 2019/0163977 A1* | 5/2019 | Chen | G06V 20/41 |
| 2020/0162641 A1* | 5/2020 | Thota | G06F 3/04847 |

OTHER PUBLICATIONS

EP, EP 20802802 Supplementary European Search Report, dated Nov. 16, 2022.

Shagan Sah et al., Video redaction: a survey and comparison of enabling technologies, Journal of Electronic Imaging, SPIE International Society for Optical Engineering, Sep./Oct. 2017, vol. 26, No. 5, United States.

\* cited by examiner

OBJECT TRACKING AND REDACTION

CROSS-REFERENCE TO RELATED APPLICATIONS

This application claims priority under 35 U.S.C. § 119(e) to U.S. Provisional Application No. 62/843,256, filed May 3, 2019, the disclosure of which is incorporated herein by reference in its entirety for all purposes.

BACKGROUND

The use of body cameras on law enforcement officers has been widely adopted by police departments across the country. While body cameras provide beneficial video evidence, their public releases (as required by many States) can have grave consequences to the privacy of bystanders. To alleviate this concern, police departments are required to redact the video of faces of bystanders. However, this redaction process takes an enormous amount of time and precious resources away from the police department.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

Overview

Figure 1:
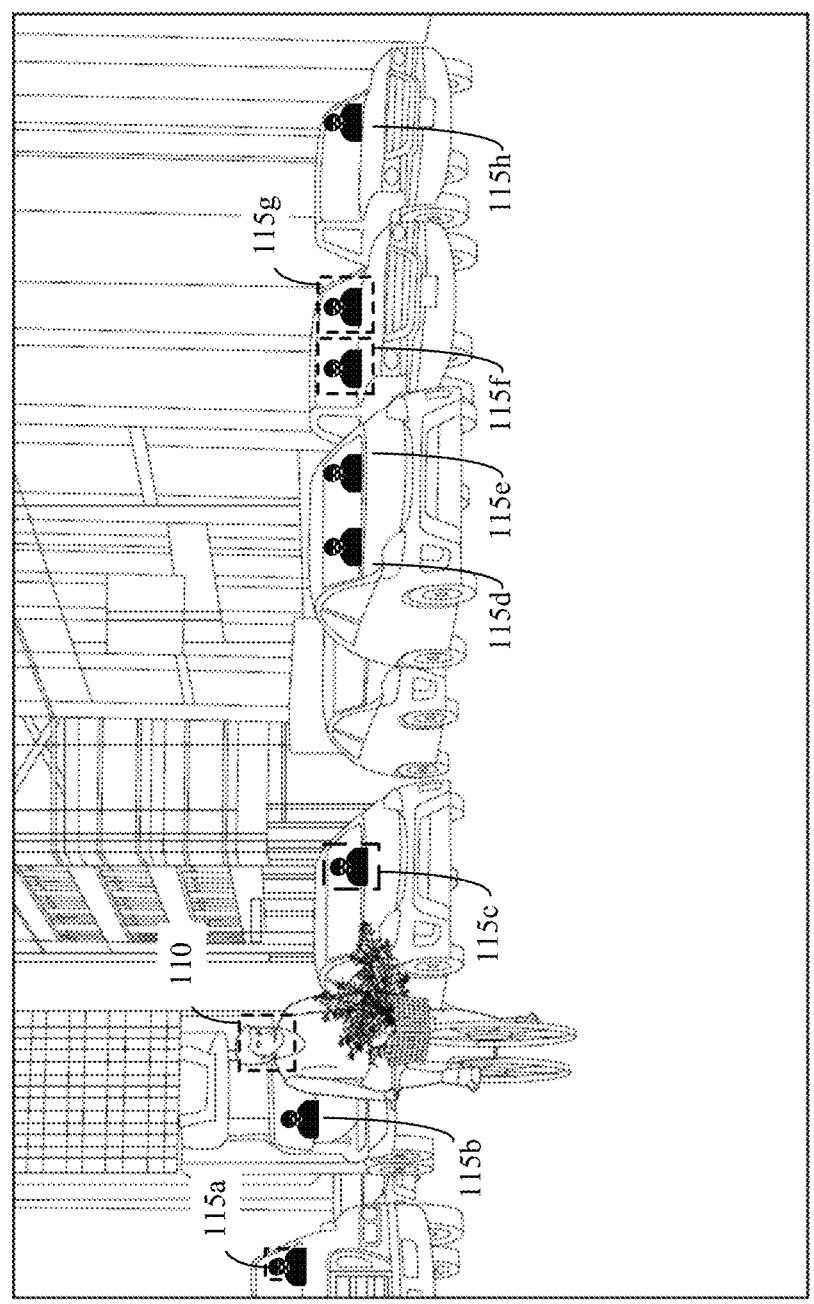
FIG. 1 illustrates an example output of a head detection neural network.

FIG. 1 is an example image 100 from a frame of a video. Let's assume that the person of interest is biker 110 and everyone else 115a-115h is of non-interest. Prior to public release for identification purposes of biker 110 or to satisfy public disclosure laws, the faces of person 115a-115h would have to be redacted from the video. This redaction process is very time consuming and labor intensive as it requires someone to manually inspect each frame of the video and draw an opaque or solid box around faces and/or heads that need to be redacted. Today, most videos are recorded in high definition at 30 frames per second (fps). For a 5-minute video, there is a total of 9,000 frames for someone to inspect and redact manually. This is cost prohibitive and inefficient. Accordingly, what is needed is an automatic head detection and redaction system that can automatically detect and redact heads and/or faces appearing in all frames of a video.

Conventional head detection algorithms can detect heads relatively well when the person face is looking straight at the camera (e.g., straight out of the picture/image). However, when the person is looking sideway or when the person is walking in/out of the left or right side of a frame with the side of the face showing, conventional head detection algorithms typically fail to detect the person head. This can lead to accidental inclusions of innocent bystander faces in a privacy-sensitive video. For example, referring to FIG. 1, conventional redaction systems are unable to detect a head/face of person 115b, 115c, 155d, 155e, and 115h. As a consequence, the undetected head cannot be redacted and the innocent bystander face may be released to the public, which could harm the person reputation or other negative ways.

The new and inventive head detection and redaction methods and systems (hereinafter "head detection-redaction system") is configured to use an inventive two-layer detection scheme for detecting heads in challenging scenarios such as when a person first entered a frame or just exited a frame, or not looking forward (e.g., out of the image).

Figure 2:
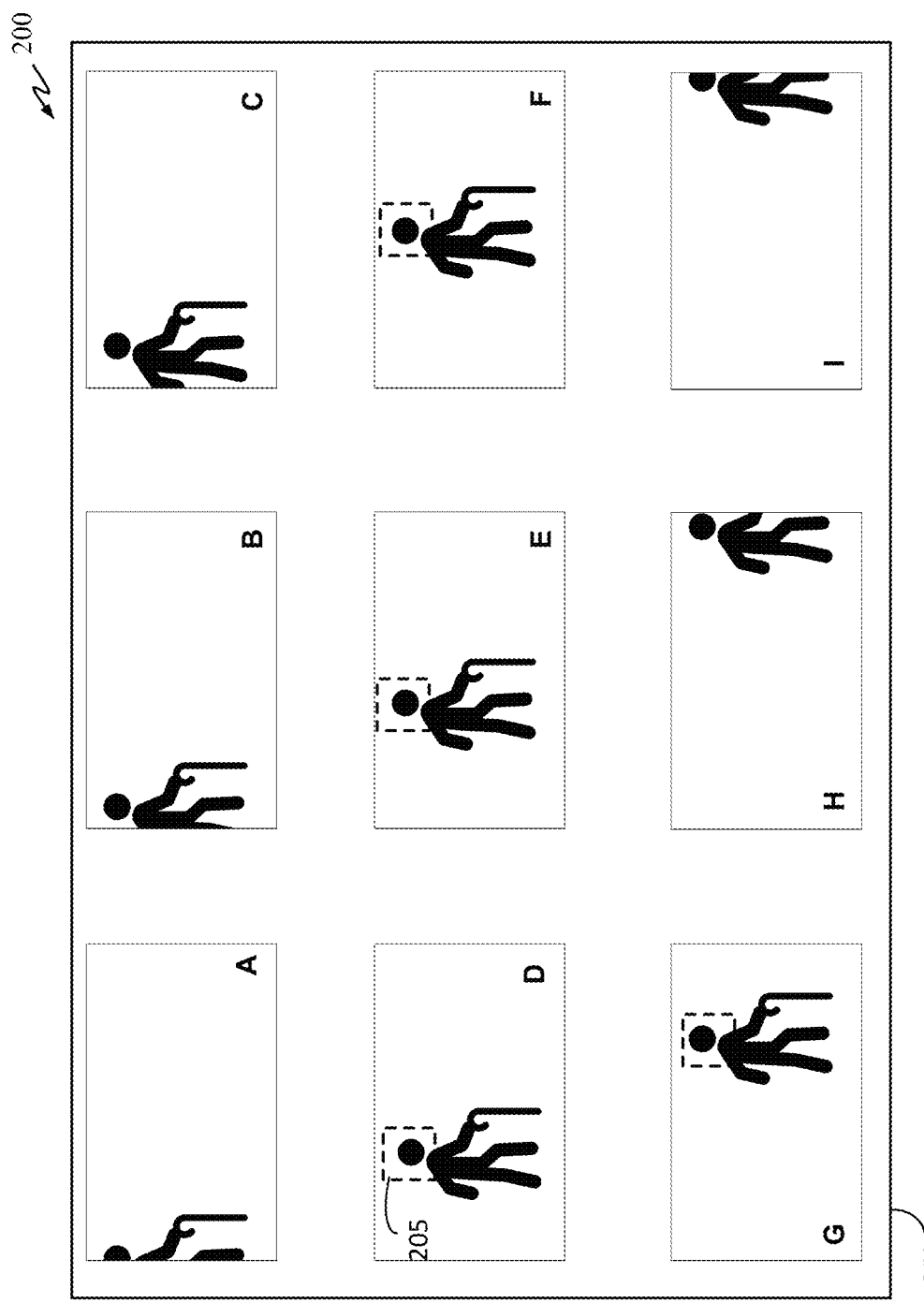
FIGS. 2-7 graphically illustrate the detection, reanalysis, and redaction processes in accordance with some embodiments of the present disclosure.

FIG. 2 illustrates the head detection process 200 of the head detection-redaction system 250 ("system 250") in accordance with some embodiments of the disclosure. For each image or frame of a video, in the first layer of the two-layer detection scheme, process 200 analyzes the image to detect one or more heads (or other objects such as license plate) using a pre-trained head detection neural network such as, but not limited to, YOLOv3 (You Only Look Once) engine, which is trained to detect heads using a head dataset. It should be noted that YOLOv3 can also be trained to detect license plate or any other privacy-sensitive objects as desired. In some embodiments, a general object detection neural network (which can include a specialized head detection engine, other specialized object detection neural network, or a combination thereof) can be trained to detect any sensitive objects such as, but not limited to, head, license plate, and other items having identifying information to be redacted.

For each frame, the object detection neural network (ODNN) can perform bounding box prediction and class prediction for each bounding box. In some embodiments, a different neural network can be used to generate the bounding boxes. Process 200 can use the ODNN to identify all heads in a frame. For example, process 200 can generate bounding box 205 for each head detected in frames D, E, F, and G. Next process 200 can identify frames without any bounding box. This can be done several ways. For example, process 200 can use the head detection engine to identify frames where no bounding box prediction is made. Frames without any bounding box can be flagged for reanalysis by a $2^{nd}$ detection layer (e.g., a different engine, neural network) of the 2-layer detection scheme of system 250.

Process 200 can also identify the very first and last instance of a head detection of a video segment. Using the first instance as a reference point, process 200 can move backward and flags all preceding frames for reanalysis by the $2^{nd}$ detection layer. Process 200 can flag all frames going backward (for reanalysis) from the first instance of detection until the beginning of the video sequence, for a certain time duration such as the preceding 1-60 seconds, a certain number of frames (e.g., 1-1000 frames), until any head is detected, or until another head belonging to the same group or person is detected. Using the last instance as a reference point, process 200 can move forward and flags all subsequent frames for reanalysis by the $2^{nd}$ detection layer. Similarly, process 200 can flag all frames going forward from the last instance of detection until the end of the video sequence, for a certain time duration such as the subsequent 1-60 seconds, a certain number of frames (e.g., 1-1000 frames), until any head is detected, or until another head belonging to the same group or person is detected.

Figure 3:
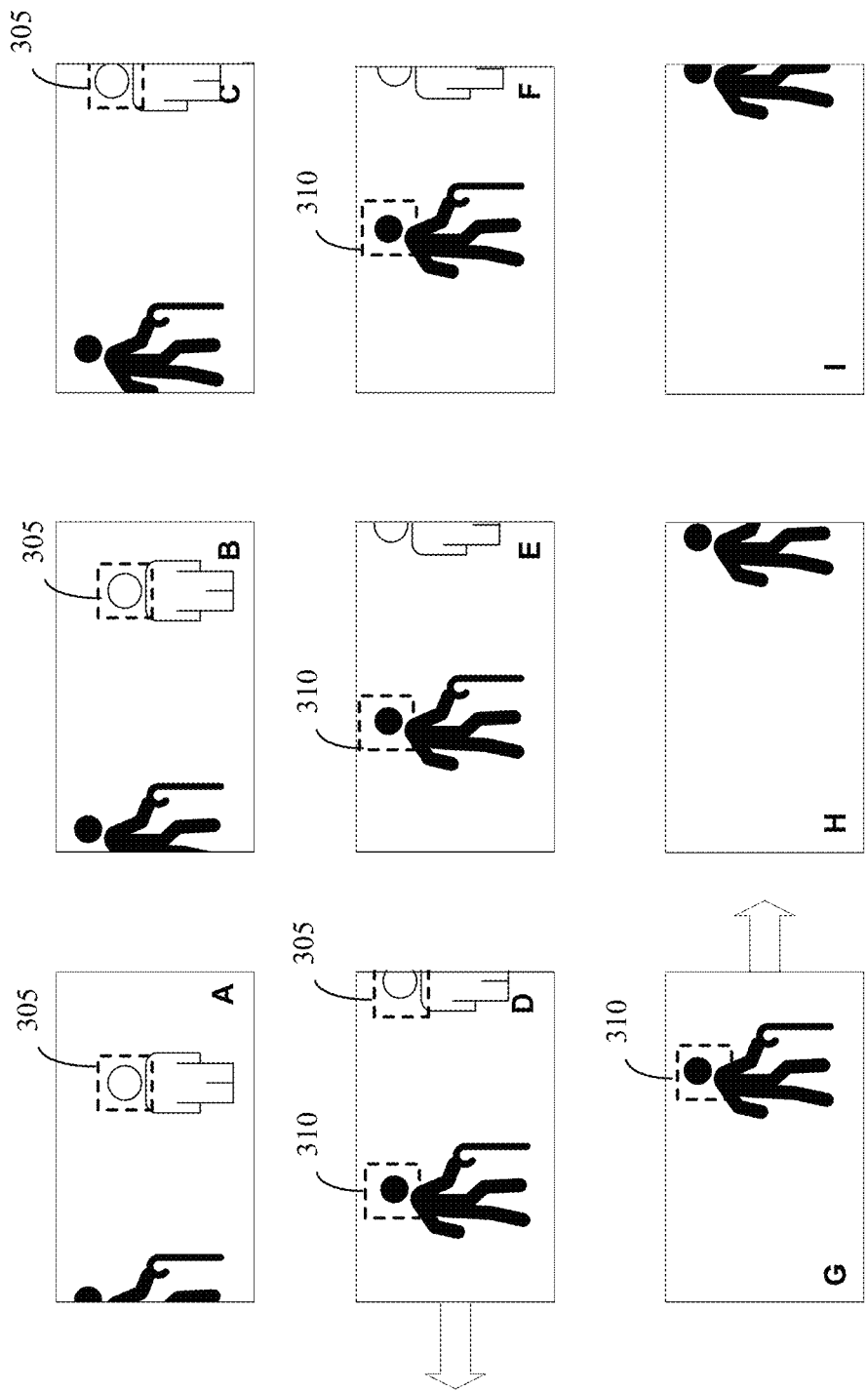

In some embodiments, process 200 can cluster each head detected in each frame into different groups. For example, FIG. 3 illustrates the head detection process 200 of system 250 of a video having two different people. As shown in FIG. 3, process 200 can cluster each of detected heads 305 and 310 into two different groups, group-305 and group-310. To identify frames for reanalysis by the $2^{nd}$ detection layer, process 200 can identify the first and last instance of detection of a head for each group and then flags frames for reanalysis as described above based on the first and last instances of detection. For example, the first instance of detection for group 305 would be in frame A. The first instance of detection for group 310 would be in frame D. The last instance of detection for group 305 would be in frame D, and the last instance of detection for group 310 would be in frame G. For group 305, frames E-I (which occur after the last instance in frame E) would be flagged for reanalysis by the $2^{nd}$ detection layer. For group 310, frames A-C and H and I would be flagged for reanalysis.

In some embodiments, process 200 may also include one or more frames at the edge (e.g., frames before the first and/or last instance of detection) to provide some overlap as it can help the optical based engine to better interpolate and perform motion vectors estimation. For example, using FIG. 2 as an example, process 200 can include one or more of frames A through C as part of the batch of frames that occur before the first instance of head 205 being detected at frame D. Frames H and I can also be included since the last instance of detection is at frame G. Accordingly, one or more frames before the first instance of detection and one or more frames after the last instance of detection can be flagged for reanalysis.

Figure 4:
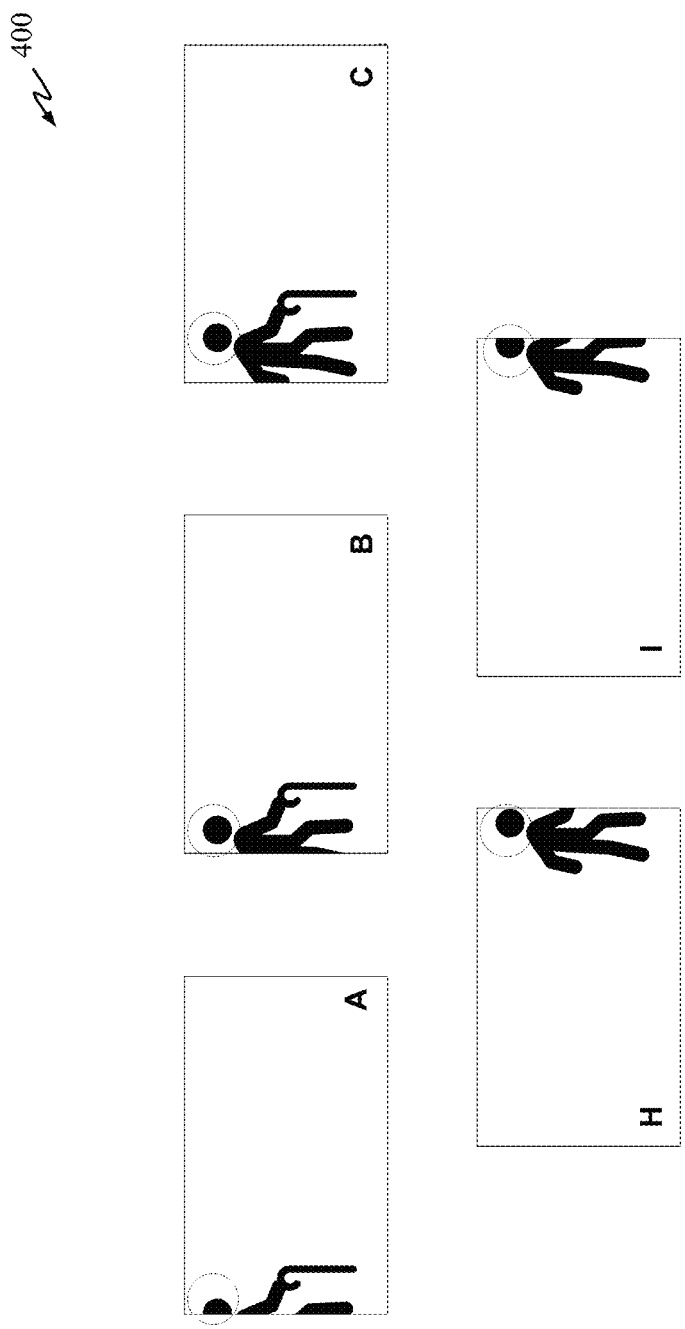

FIG. 4 illustrates a process 400 for detecting head by the $2^{nd}$ detection layer of system 250 in accordance with some embodiments of the present disclosure. As shown, frames A, B, C, H, and I are frames that were flagged for reanalysis by process 200. Process 400 can use another head detection neural network with a different architecture than the YOLOv3 architecture for example. In some embodiments, process 400 can use an optical classification engine such as, but not limited to, a support vector machine (SVM) (e.g., dlib correlation tracking engine), and other engines using optical flow and/or motion vector estimation. Correlation tracking engine can track on object by correlating a set of pixel from one frame to the next. Optical flow engine can provide valuable information about the movement of the head and motion vector estimation can provide the estimate of the objection position from consecutive frames. Together, optical flow and motion vector estimation can provide faster and more accurate object detection and tracking.

Figure 5:
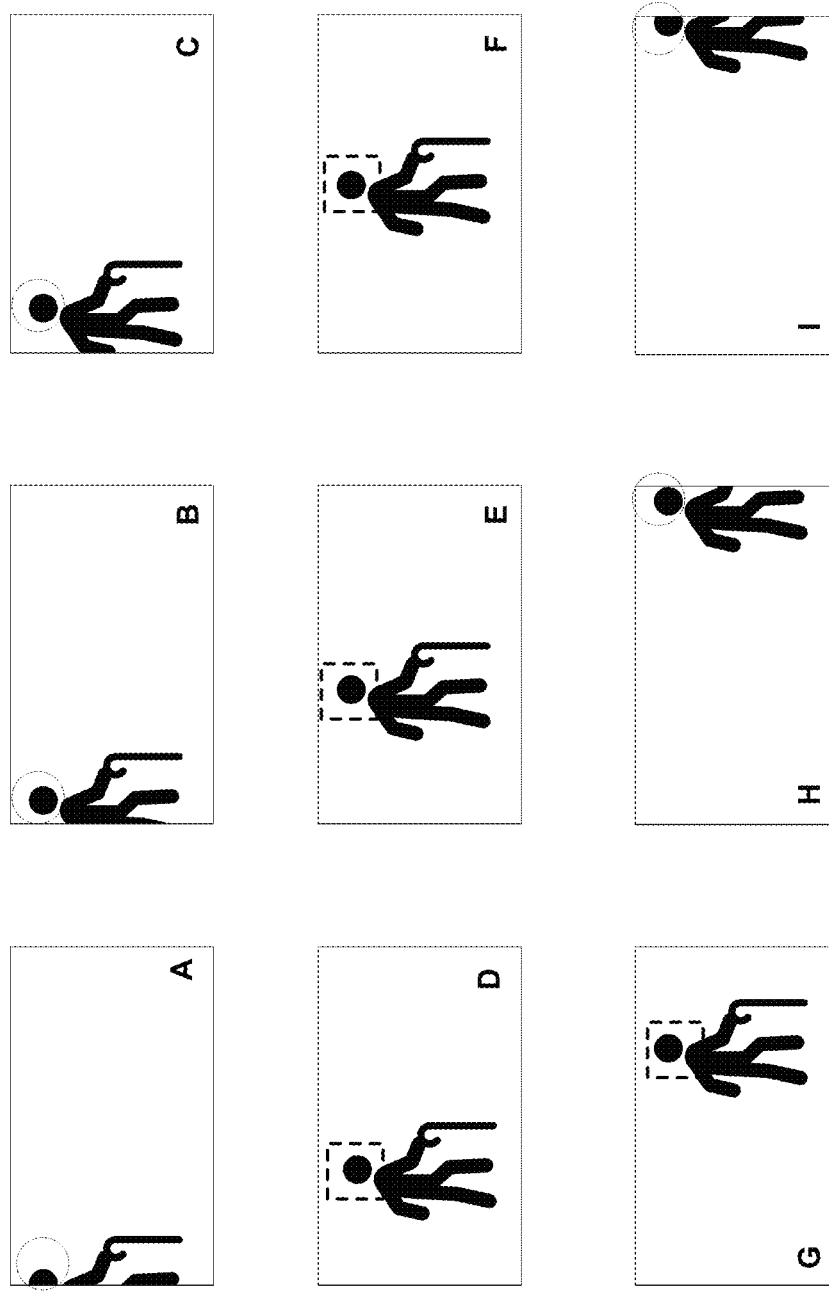

In some embodiments, a second head detection engine such as an optical image classification engine (e.g., dlib correlation tracking, optical flow, motion vector estimation) can be used by process 400. Once the head is detected from the each of the frames flagged by process 200, the result can be merged with the head detection result from the first engine (e.g., $1^{st}$ layer detection engine) as shown in FIG. 5. The $2^{nd}$ detection layer can also use the same ODNN used in the first detection layer. In this way, a two pass approach is employed.

Figure 6:
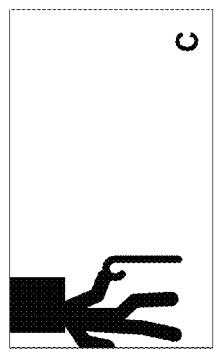
Figure 6:
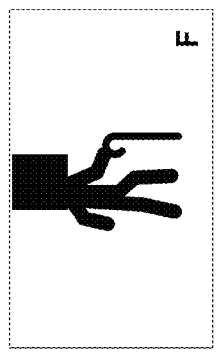
Figure 6:
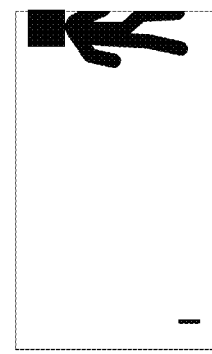
Figure 6:
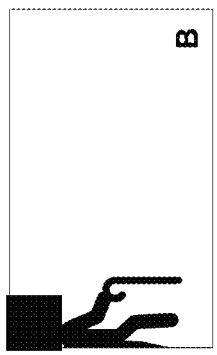
Figure 6:
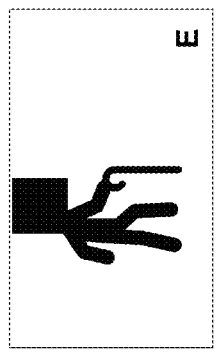
Figure 6:
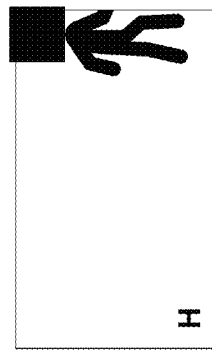
Figure 6:
Figure 6:
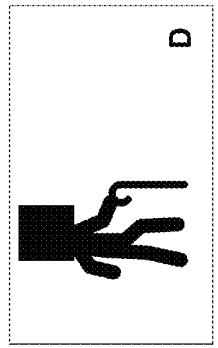
Figure 6:
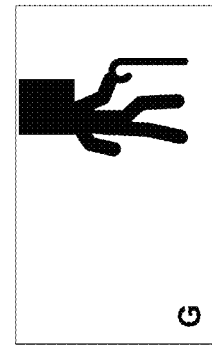
Figure 7:
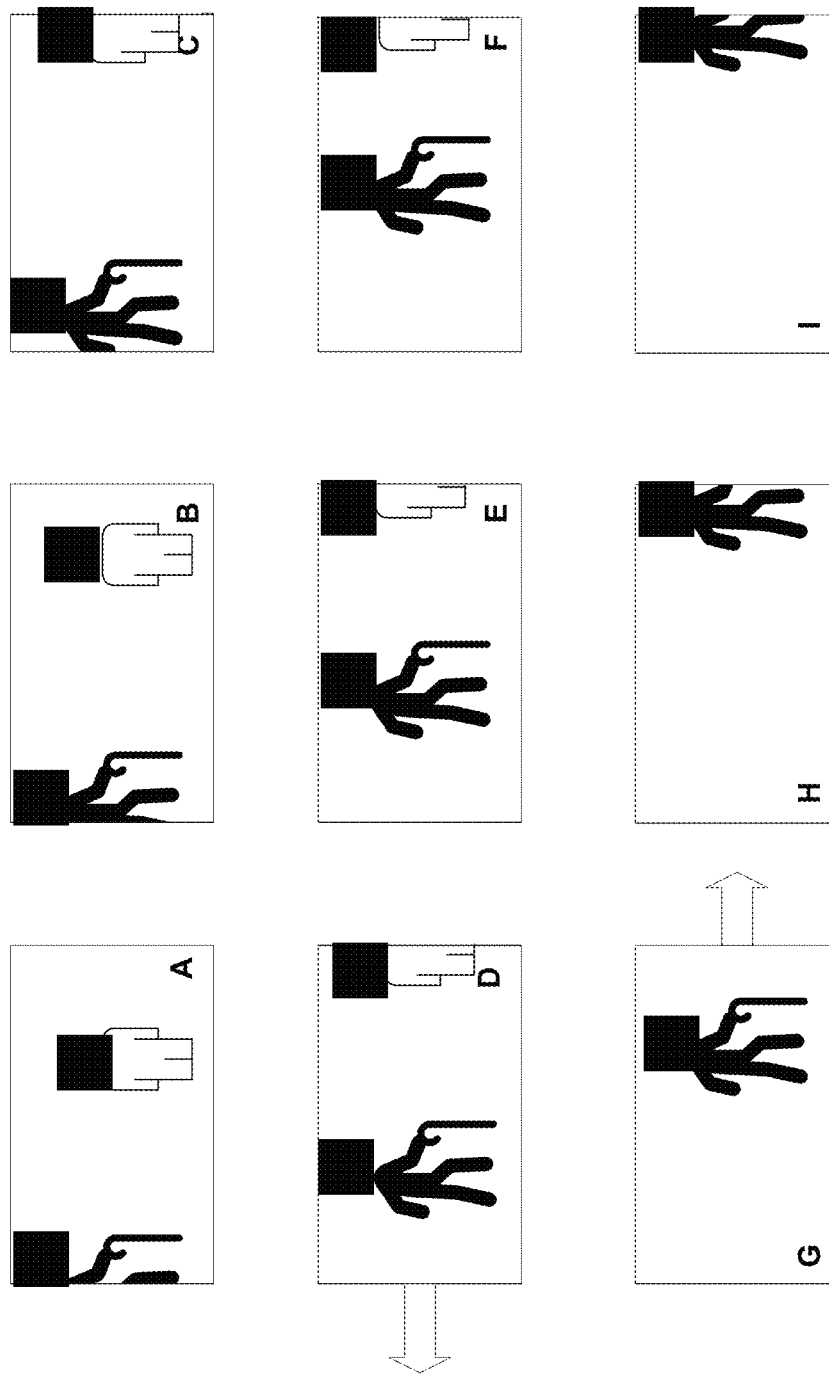

FIG. 6 illustrates the redaction process of system 250 once the head detection results are merged from the $1^{st}$ layer and $2^{nd}$ layer head/object detection engines (or from the 2-pass approach one of the first and second detection layers). FIG. 7 illustrates the redaction process of system 250 of a video having two or more person to be redacted. By combining head detection results from two different classification engines, a more accurate redaction results near the edges (e.g., going in and out of a frame) can be achieved.

Figure 8:
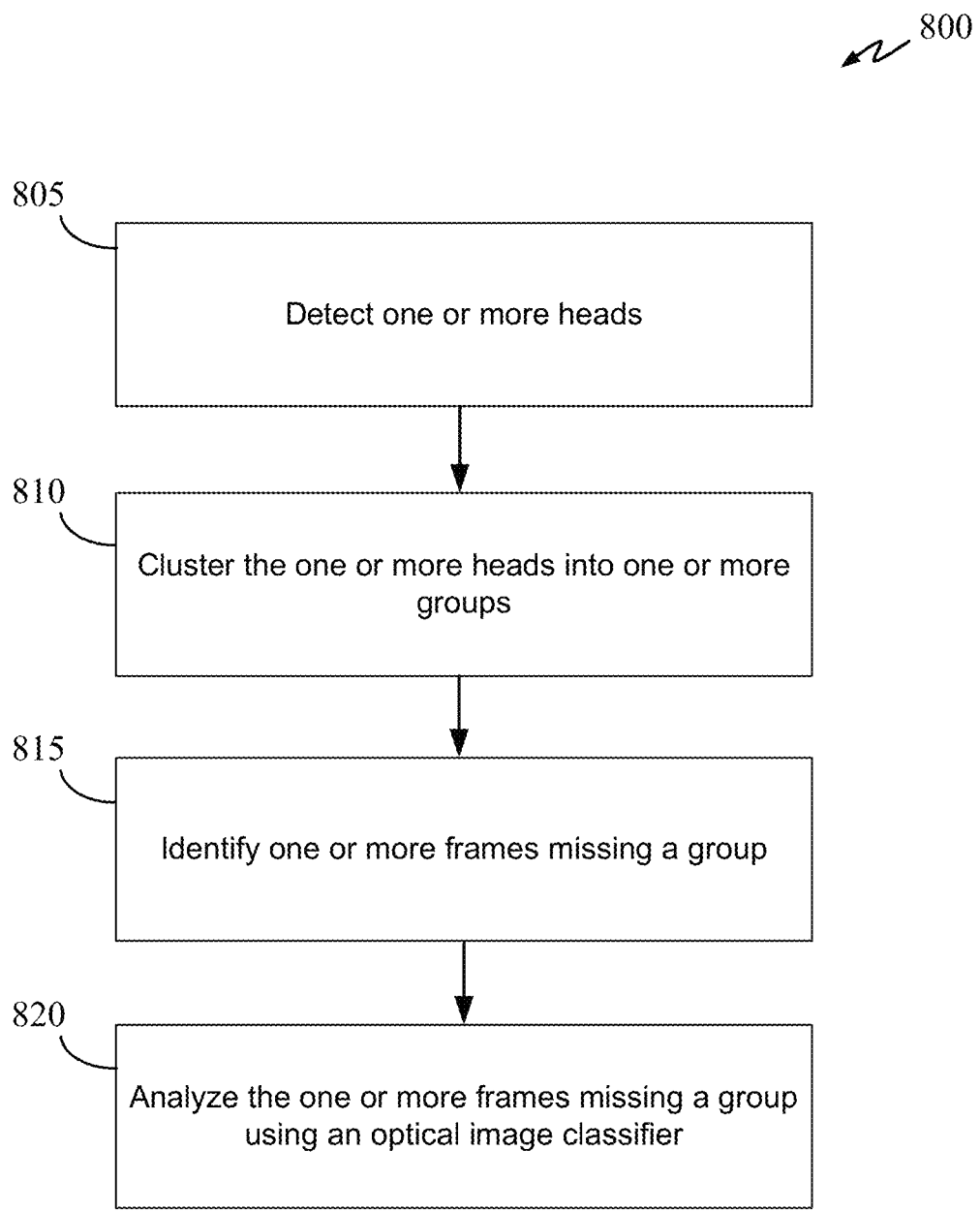
FIGS. 8-10 are flow diagrams of redaction processes in accordance with some embodiments of the present disclosure.

FIG. 8 illustrates a process 800 for detecting and redacting an object (e.g., face, head, license plate) in accordance with some embodiments of the present disclosure. System 250 can be configured to implement the features and functions of process 800 as described below. Process 800 starts at 805 where one or more heads are detected in each frame of an input video file, which can be a small segment of a video file or the entire video file. At 805, a trained head detection neural network can be used to detect one or more heads in each frame. At 810, the one or more heads detected across the frames of the video can be clustered into distinct groups based at least on coordinates and interpolation of bounding boxes of the detected one or more heads. For example, the video file can have 3 different persons in various frames. Subprocess 810 is configured to cluster the bounding boxes of each person detected in various frames in the video into unique groups—one person per group. This can be done based at least on coordinates of the bounding boxes, interpolation, and/or an accounting of heads per frame and/or per video.

At subprocess 815, frames that are missing a head belonging to a group are flagged for reanalysis to determine whether that head is actually missing. For example, if the video has only one group of heads and certain frames do not have any head detected (e.g., no bounding box prediction and/or head classification), these frames without any detected head are identify and flagged for reexamination by a second classification engine.

Referring to FIG. 3, frames E-I can be flagged for reexamination because a head belonging to a group for person 305 is missing. Similarly, frames A-C and H and I can also be flagged for reexamination because a head belonging to a group for person 310 is missing.

At subprocess 820, frames that have been identify as missing a head for a group are reanalyzed for head using a second (different) head detection engine such as an optical image classification engine (e.g., correlation tracking, motion estimation). Head detection results from 805 and 820 can be combined to form a merged head detection result, from which one or more heads can be properly selected for redaction.

Figure 9:
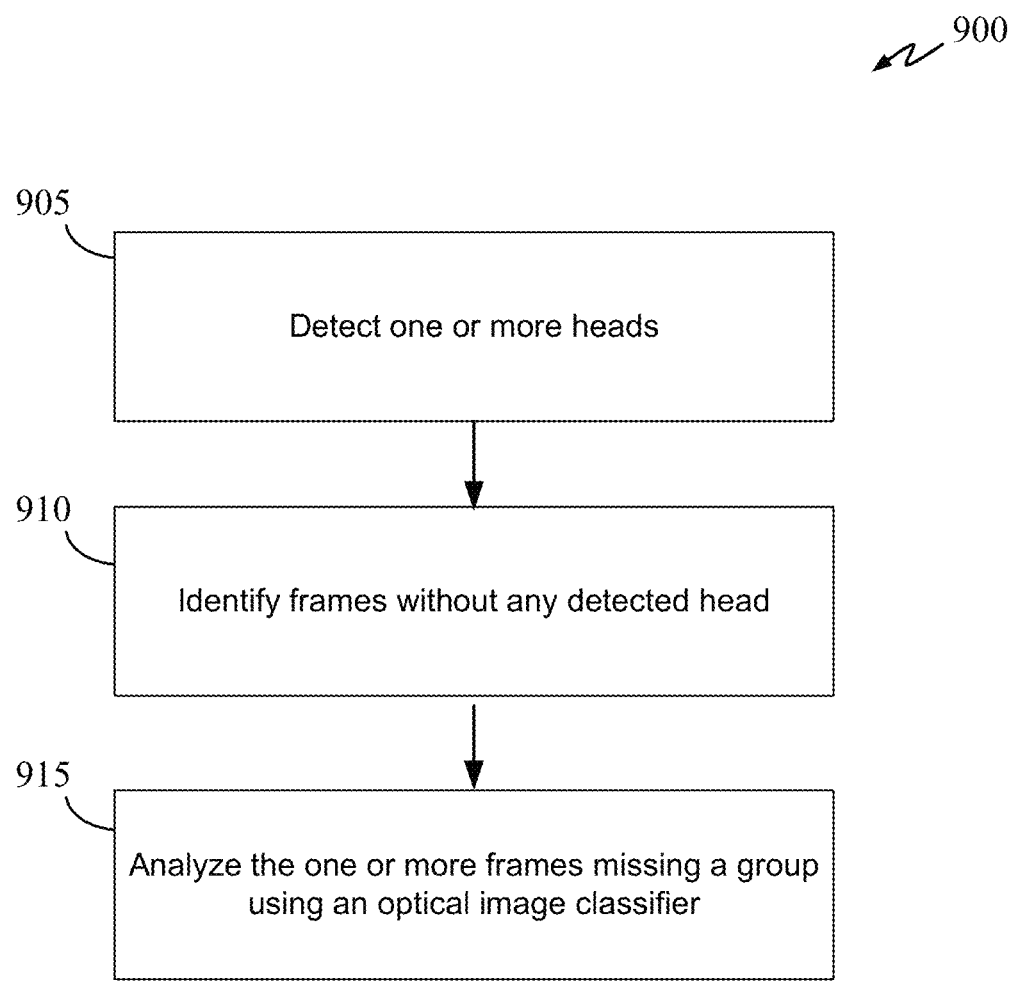

FIG. 9 illustrates a process 900 for detecting and redacting an object in accordance with some embodiments of the present disclosure. At 905, one or more objects (e.g., heads) are detected from each frame of the video using a first head/object detection neural network. At 910, any frame without any detected head is flagged for reanalysis. At 915, frames that have been identified for zero head detection are reanalyzed by the $2^{nd}$ detection layer using a second and different head detection engine, which can be another neural network or an optical based image classification engine. Head detection results from 905 and 915 can be combined to form a merged results of detected heads.

Figure 10:
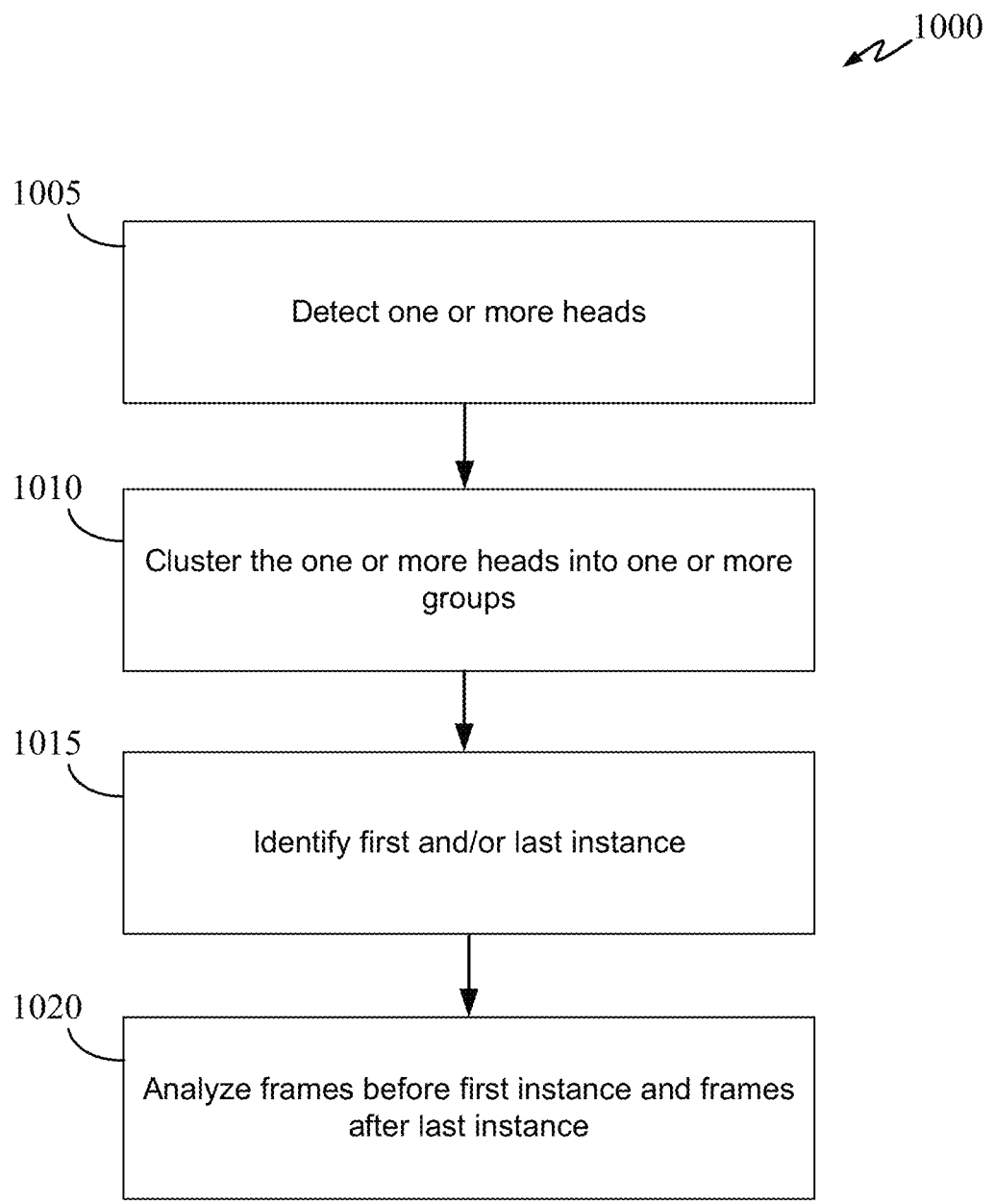

FIG. 10 illustrates a process 1000 for detecting and redacting an object in accordance with some embodiments of the present disclosure. At 1005, one or more objects (e.g., heads) are detected using a first pre-trained head detection classifier. At 1010, each detected head is clustered into one or more distinct groups. At 1015, for each group, identify the first instance and the last instance of detection of a head for that group. At 1020, frames appearing before the frame containing first instance of the detected head are reanalyzed using a second (different) image classifier to detect one or more heads that may have been missed by the first pre-trained head detection classifier. Frames appearing after the frame having last instance of the detected head are also reanalyzed using the second image classifier. Next, results from 1005 and 1020 can be combined for the redaction process.

Figure 11:
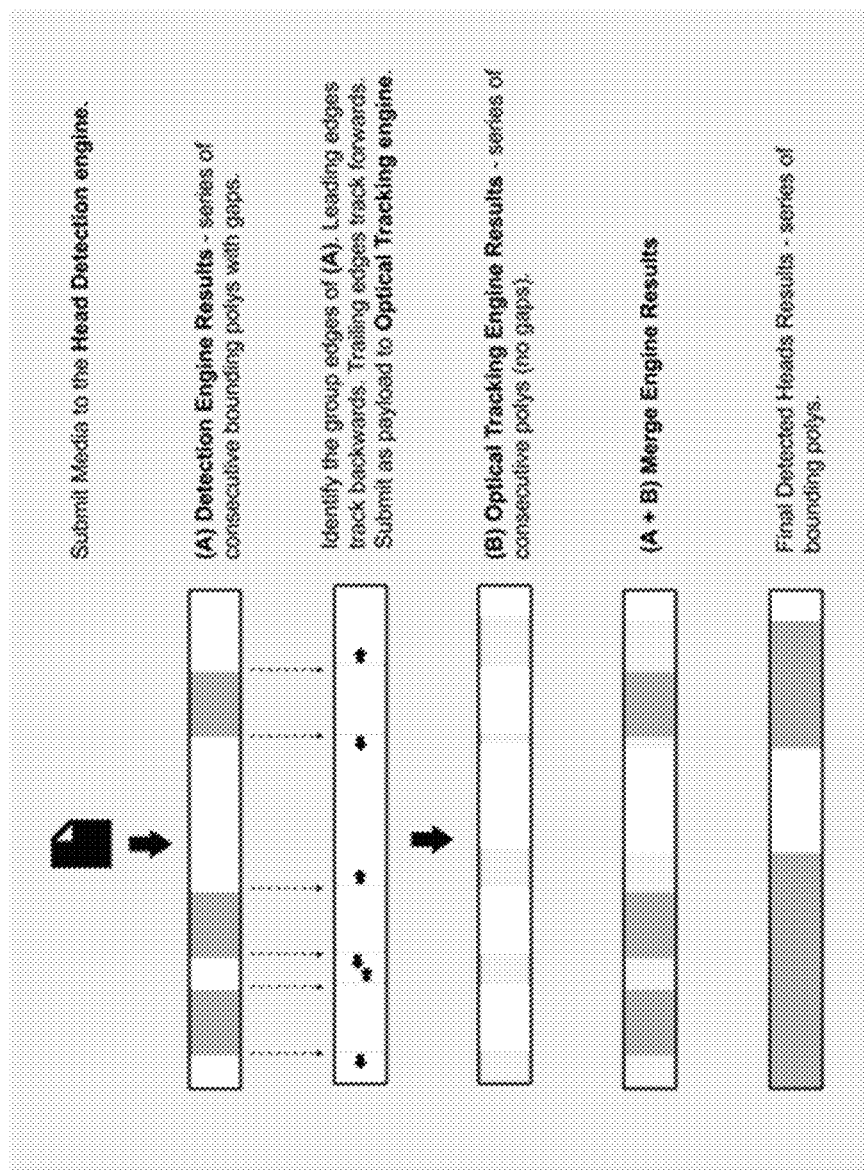
FIGS. 11-12 are graphical illustrations of the redaction processes in accordance with some embodiments of the present disclosure.

FIG. 11 illustrates a process 1100 for detecting an object/head in a video in accordance with some embodiments of the present disclosure. Process 1100 starts at 1105 where the input video or a portion of the input video is analyzed by a boundary box engine, which is configured to place a boundary box around each detected object. The boundary box engine can be part of the head detection engine or the ODNN. The boundary box engine can be trained to specifically recognize a human head and to put a boundary box around a human head.

At 1110, the leading (first) and trailing (last) frames of a group of frames having the boundary boxes are identified. For example, a group of frames 1130 can contain boundary boxes that span multiple frames. The first frame (the left-most frame) before group of frames 1130 is identified at 1110. This is indicated by arrow 1135. The first frame can be the last frame having a head boundary or one or more frame before the last frame with the head boundary (boundary box of a human head). Similarly, the last frame can be indicated by arrow 1140, which can be the last frame with a boundary box of a human head or one or more frames after that reference frame.

At 1115, all of the frames in regions 1117a, 1117b, 1117c, 1117d, and 1117e are reanalyzed to determine whether a face or head exists. At 1120, any frames in groups of frames 1117a through 1117d with head being detected are then merged. At 1125, all of the detected heads in the merged frames can be redacted. It should be noted that the head redaction can be done for each region/group identified at 1115 or 1120 separately and independently. IN this way, when the video is merged at 1125, the video only contains redacted.

Figure 12:
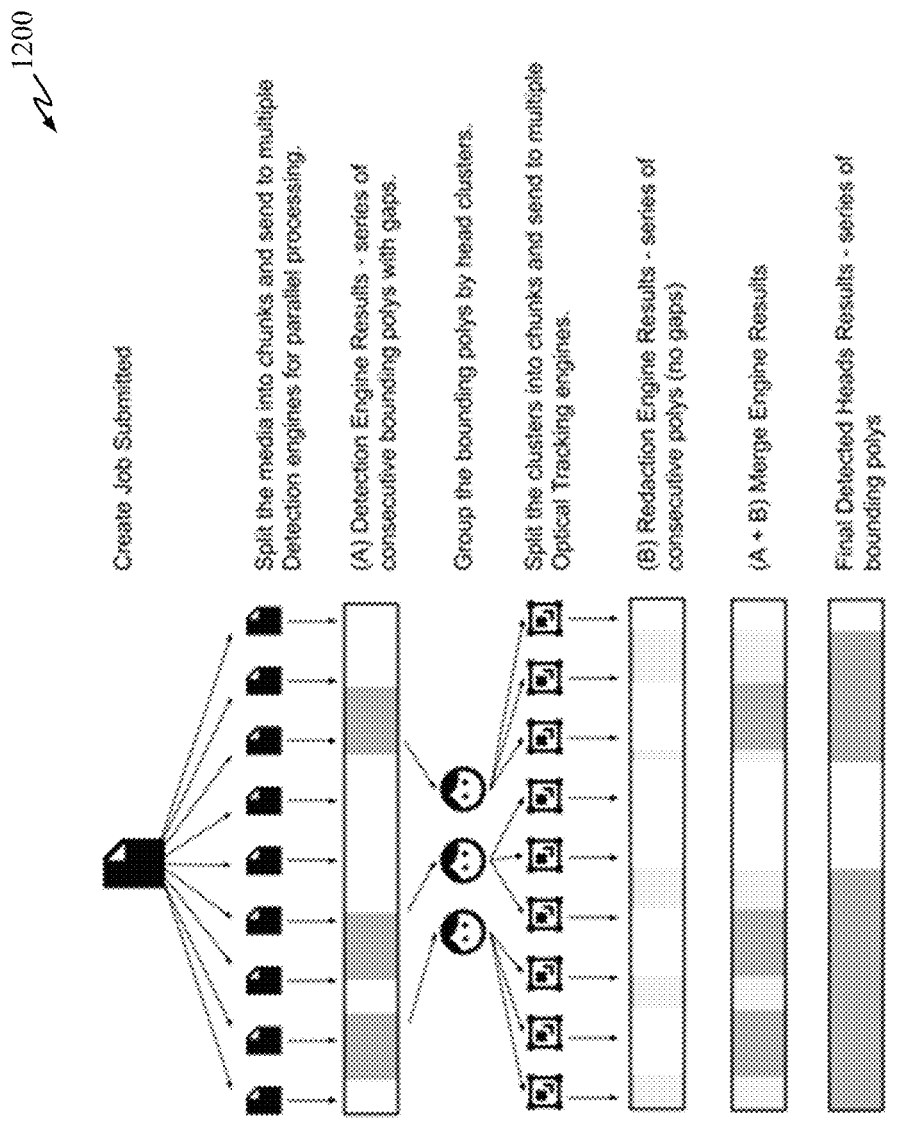

FIG. 12 is a process 1200 for redacting a head/object from a video in accordance with some embodiments of the present disclosure. Process 1200 can adopt one or more functions of process 1100 as described with respect to FIG. 11. In process 1200, prior to detecting a head or a desired object, the video file is segmented into a plurality of portions. In this way, different portions can be sent to different engines or ODNNs to enable parallel processing. In some embodiments, at 1205, one or more groups of frames having boundary boxes (of human heads) are identified and are sent to different optical tracking engines at 1210. This enables process 1200 to track a large number of moving objects (e.g., heads) accurately and efficiently. For example, process 1200 can send a first group of frames (having boundary boxes) 1220 to one optical classification engine and a second group of frames 1225 to another optical classification engine, which can be a support vector machine, dlib correlation tracking engine, or other engines using optical flow and/or motion vector estimation.

Embodiments

Disclosed above are systems and methods for detecting and redacting one or objects (e.g., heads) from frames of a video. One of the method comprises: detecting a first group of one or more objects, using a first neural network, in each frame of the video; clustering each of the detected one or more objects of the first group in each frame into one or more clustered-object groups; identifying one or more frames of the video without one of the one or more clustered-object groups; and analyzing the identified one or more frames, using an optical image classification engine, to detect a second group of one or more objects in the identified one or more frames.

The method further comprises clustering one or more objects of the second group detected from each of the identified one or more frames into the one or more clustered-object groups. The method further comprises redacting objects belonging to a first clustered-object group of the one or more clustered-object groups. The method further comprises merging the first and second groups to form a merged list of detected objects in the video.

Redacting one or more of the detected objects can further comprise: displaying on a display device one or more objects from each of the one or more clustered-object groups; receiving, from a user, a selection of one or more objects from one or more clustered-object groups; and redacting one or more objects based on the selection of the one or more objects.

Detecting the first group of one or more objects can comprise defining a boundary perimeter for each of the detected one or more objects of the first group. Clustering each of the detected one or more objects can comprise clustering the one or more objects into the one or more clustered-object groups based at least on a coordinate of the boundary perimeter of each head and/or interpolation.

Detecting the first group of one or more objects can include: generating bounding boxes for one or more objects in each frame; and detecting one or more objects by classifying image data within the bounding boxes.

Clustering each of the detected one or more objects can comprise: extracting object features for each of the detected one or more objects using scale invariant feature transform; and clustering the one or more objects into the one or more clustered-object groups based at least on the extracted object features.

A second disclosed method for detecting an object across frames of a video includes: detecting one or more objects, using a first image classifier, in each frame of the video; grouping the one or more objects detected over multiple frames of the video into one or more groups of distinct object; identifying a first or last instance of detection of an object of a first groups of distinct object; and analyzing frames occurring before the first instance or frames occurring after the last instance using a second image classifier to detect one or more additional objects.

The method further comprises redacting one or more objects of the first group and the one or more additional objects from the video. The method further comprises identifying the first or last instance comprises identifying the first and the last instance of detection of the object of the first group.

In this example method, analyzing frames occurring before the first instance or frames occurring after the last instance comprises analyzing frames occurring before the first instance and frames occurring after the last instance of detection to detect one or more additional objects.

Analyzing frames occurring before the first instance can comprise analyzing frames occurring up to 10 seconds before the first instance. Analyzing frames occurring after the last instance can include analyzing frames occurring up to 10 seconds after the last instance.

Analyzing frames occurring before the first instance or frames occurring after the last instance can comprise analyzing frames occurring before and after until a head is detected.

In another method for detecting an object across frames of a video, the method includes: detecting one or more heads, using a first neural network, in each frame of the video; identifying one or more frames of the video without any detected head; and analyzing the identified one or more frames, using an optical image classification engine, to detect a second group of one or more heads in the identified one or more frames.

In another method for detecting an object across frames of a video, the method includes: detecting one or more heads, using a first neural network, in each frame of the video; clustering the one or more heads into one or more groups; and analyzing the identified one or more frames, using an optical image classification engine, to detect a second group of one or more heads in the identified one or more frames.

In some embodiments, one of the disclosed systems ("a first system") for detecting an object across frames of a video includes a memory and one or more processors coupled to the memory. The memory includes instructions that when executed by the one or more processors, cause the one or more processors to: detect a first group of one or more objects, using a first neural network, in each frame of the video; cluster each of the detected one or more objects of the first group in each frame into one or more clustered-object groups; identify one or more frames of the video missing one of the one or more clustered-object groups; and analyze the identified one or more frames, using an optical image classification engine, to detect a second group of one or more objects in the identified one or more frames.

The memory can further include instructions that cause the one or more processors to cluster one or more objects of the second group detected from each of the identified one or more frames into the one or more clustered-object groups.

The memory can further include instructions that cause the one or more processors to redact objects belonging to a first clustered-object group of the one or more clustered-object groups.

The memory can further include instructions that cause the one or more processors to merge the first and second groups to form a merged list of detected objects in the video.

The memory can further include instructions that cause the one or more processors to redact one or more of the detected objects of the merged list from the video.

The memory can further include instructions that cause the one or more processors to: display on a display device one or more objects from each of the one or more clustered-object groups; receive, from a user, a selection of one or more objects from one or more clustered-object groups; and redact one or more objects based on the selection of the one or more objects.

In the first system, the memory can further include instructions that cause the one or more processors to: detect the first group of one or more objects by defining a boundary perimeter for each of the detected one or more objects of the first group; and to cluster each of the detected one or more objects by clustering the one or more objects into the one or more clustered-object groups based at least on a coordinate of the boundary perimeter of each head.

The memory can further include instructions that cause the one or more processors to: generate bounding boxes for one or more objects in each frame; and
detect the one or more objects by classifying image data within the bounding boxes.

The memory can further include instructions that cause the one or more processors to: cluster of each of the detected one or more objects of the first group in each frame into one or more clustered-object groups by extracting object features for each of the detected one or more objects using scale invariant feature transform; and clustering the one or more objects into the one or more clustered-object groups based at least on the extracted object features.

In the first system, the optical image classification engine can include an optical flow engine or a motion estimation engine, and where the second group of one or more objects can include one or more different subgroups.

In some embodiments, a second system for detecting a head across frames of a video is disclosed. The second system includes a memory and one or more processors coupled to the memory. The memory includes instructions that when executed by the one or more processors cause the processors to: detect one or more heads, using a first image classifier, in each frame of the video; group the one or more heads detected over multiple frames of the video into one or more groups of distinct head; identify a first or last instance of detection of a head of a first groups of distinct head; and analyze frames occurring before the first instance or frames occurring after the last instance using a second image classifier to detect one or more additional heads.

A second method for detecting an object across frames of a video is also disclosed. The second method includes: detecting one or more heads, using a first neural network, in each frame of the video; identifying one or more frames of the video without any detected head; and analyzing the identified one or more frames, using an optical image classification engine, to detect a second group of one or more heads in the identified one or more frames.

A third method for detecting heads in a video includes: detecting one or more heads, using a first neural network, in each frame of the video; clustering the one or more heads into one or more groups; and analyzing the identified one or more frames, using an optical image classification engine, to detect a second group of one or more heads in the identified one or more frames.

System Architecture

Figure 13:
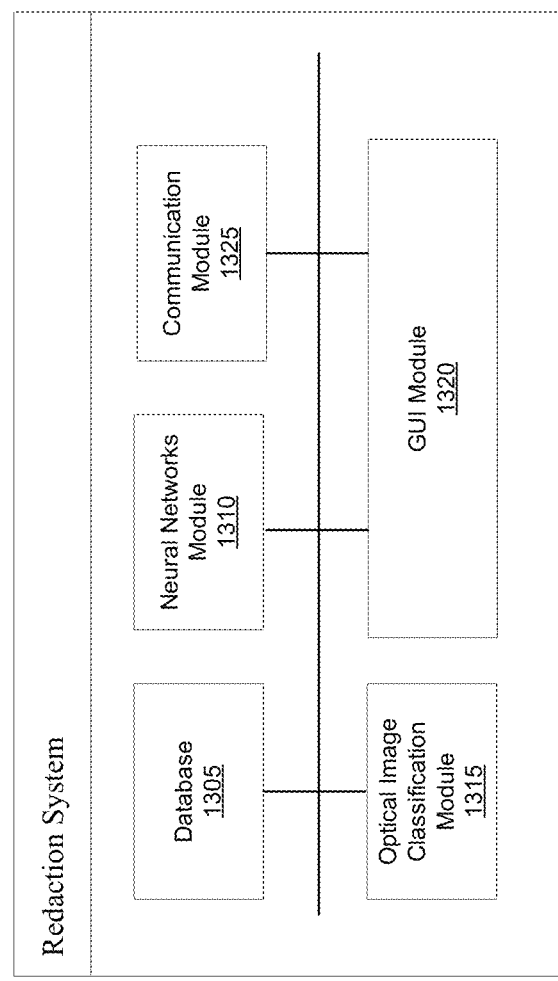
FIG. 13 illustrates a block diagram of a redaction system in accordance with some embodiments of the present disclosure.

FIG. 13 is a system diagram of an exemplary redaction system 1300 for detection and redacting objects in accordance with some embodiments of the present disclosure. System 13 includes a database 1305, neural network module 1310, optical image classification module 1315, GUI module 1320, and communication module 1325. Neural network module 1310 includes pre-trained neural networks to classify (e.g., detect, recognize) various kind of objects (e.g., head, license plate) as implemented by at least processes 200, 400, 800, 900, and 1000. Optical image classification module 1315 includes optical image classification engines such as dlib correlation tracker, optical flow, and motion vectors estimation as implemented by at least processes 200, 400, 800, 900, and 1000.

Figure 14:
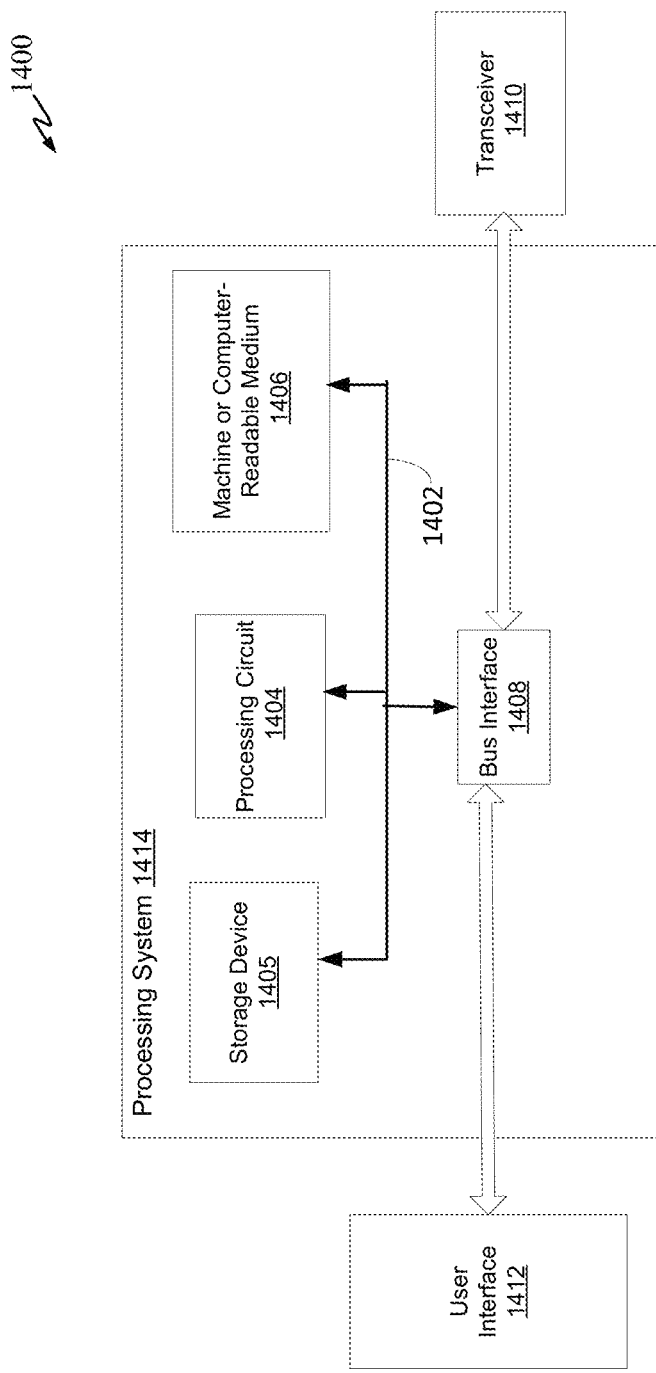
FIG. 14 illustrates a general system diagram that can be configured to perform the various processes described in FIGS. 2-13, The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

FIG. 14 illustrates an exemplary overall system or apparatus 1400 in which processes 200, 400, 500, and 600 can be implemented. In accordance with various aspects of the disclosure, an element, or any portion of an element, or any combination of elements may be implemented with a processing system 1414 that includes one or more processing circuits 1404. Processing circuits 1404 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 1404 may be used to implement any one or more of the processes described above and illustrated in FIGS. 2, 4, 5, 6, 7, 8, 9, 10, 11, and 12.

In the example of FIG. 14, the processing system 1414 may be implemented with a bus architecture, represented generally by the bus 1402. The bus 1402 may include any number of interconnecting buses and bridges depending on the specific application of the processing system 1414 and the overall design constraints. The bus 1402 may link various circuits including one or more processing circuits (represented generally by the processing circuit 1404), the storage device 1405, and a machine-readable, processor-readable, processing circuit-readable or computer-readable media (represented generally by a non-transitory machine-readable medium 1409). The bus 1402 may also link various other circuits such as timing sources, peripherals, voltage regulators, and power management circuits, which are well known in the art, and therefore, will not be described any further. The bus interface 1408 may provide an interface between bus 1402 and a transceiver 1413. The transceiver 1410 may provide a means for communicating with various other apparatus over a transmission medium. Depending upon the nature of the apparatus, a user interface 1412 (e.g., keypad, display, speaker, microphone, touchscreen, motion sensor) may also be provided.

The processing circuit 1404 may be responsible for managing the bus 1402 and for general processing, including the execution of software stored on the machine-readable medium 1409. The software, when executed by processing circuit 1404, causes processing system 1414 to perform the various functions described herein for any particular apparatus. Machine-readable medium 1409 may also be used for storing data that is manipulated by processing circuit 1404 when executing software.

One or more processing circuits 1404 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

For example, instructions (e.g., codes) stored in the non-transitory computer readable memory, when executed, may cause the processors to: select, using a trained layer selection neural network, a plurality of layers from an ecosystem of pre-trained neural networks based on one or more attributes of the input file; construct, in real-time, a new neural network using the plurality of layers selected from one or more neural networks in the ecosystem, wherein the new neural network is fully-layered, and the selected plurality of layers are selected from one or more pre-trained neural network; and classify the input file using the new fully-layered neural network.

The software may reside on machine-readable medium 1409. The machine-readable medium 1409 may be a non-transitory machine-readable medium. A non-transitory processing circuit-readable, machine-readable or computer-readable medium includes, by way of example, a magnetic storage device (e.g., solid state drive, hard disk, floppy disk, magnetic strip), an optical disk (e.g., digital versatile disc (DVD), Blu-Ray disc), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1409 may reside in the processing system 1414, external to the processing system 1414, or distributed across multiple entities including the processing system 1414. The machine-readable medium 1409 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Conclusion

The enablements described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

The invention claimed is:

1. A method for detecting an object across frames of a video, the method comprising:
   detecting a first group of one or more objects, using a first neural network, in each frame of the video using a first layer of a two-layer detection scheme;
   clustering each of the detected one or more objects of the first group in each frame into one or more clustered-object groups;
   identifying one or more frames of the video without one of the one or more clustered-object groups; and
   analyzing the identified one or more frames, using an optical image classification engine, to detect a second group of one or more objects in the identified one or more frames using a second layer of the two-layer detection scheme.

2. The method of claim 1, further comprising:
   clustering one or more objects of the second group detected from each of the identified one or more frames into the one or more clustered-object groups.

3. The method of claim 2, further comprising:
   redacting objects belonging to a first clustered-object group of the one or more clustered-object groups.

4. The method of claim 1, further comprising:
   merging the first and second groups to form a merged list of detected objects in the video.

5. The method of claim 4, further comprising:
   redacting one or more of the detected objects of the merged list from the video.

6. The method of claim 5, wherein redacting one or more of the detected objects comprises:
   displaying on a display device one or more objects from each of the one or more clustered-object groups;

receiving, from a user, a selection of one or more objects from one or more clustered-object groups; and redacting one or more objects based on the selection of the one or more objects.

7. The method of claim 1, wherein detecting the first group of one or more objects comprises defining a boundary perimeter for each of the detected one or more objects of the first group; and wherein clustering each of the detected one or more objects comprises clustering the one or more objects into the one or more clustered-object groups based at least on a coordinate of the boundary perimeter of each head.

8. The method of claim 6, wherein detecting the first group of one or more objects comprises:

generating bounding boxes for one or more objects in each frame; and detecting one or more objects by classifying image data within the bounding boxes.

9. The method of claim 1, wherein clustering each of the detected one or more objects comprises:

extracting object features for each of the detected one or more objects using scale invariant feature transform; and clustering the one or more objects into the one or more clustered-object groups based at least on the extracted object features.

10. The method of claim 1, wherein the optical image classification engine comprises an optical flow engine or a motion estimation engine, and wherein the second group of one or more objects comprises one or more different subgroups of objects.

11. A method for detecting an object across frames of a video, the method comprising:

detecting one or more objects, using a first image classifier, in each frame of the video using a first layer of a two-layer detection scheme;

grouping the one or more objects detected over multiple frames of the video into one or more groups of distinct object;

identifying a first or last instance of detection of an object of a first groups of distinct object; and analyzing frames occurring before the first instance or frames occurring after the last instance using a second image classifier to detect one or more additional objects using a second layer of the two-layer detection scheme.

12. The method of claim 11, further comprising:

redacting one or more objects of the first group and the one or more additional objects from the video.

13. The method of claim 11, wherein the first and second image classifiers comprise a head detection neural network and an optical image classifier, respectively.

14. The method of claim 13, wherein the optical image classifier comprises an optical flow classifier or a motion vector estimation classifier.

15. The method of claim 13, wherein the optical image classification engine comprises a dlib correlation tracker engine.

16. The method of claim 11, wherein identifying the first or last instance comprises identifying the first and the last instance of detection of the object of the first group.

17. The method of claim 11, wherein analyzing frames occurring before the first instance or frames occurring after the last instance comprises analyzing frames occurring before the first instance and frames occurring after the last instance of detection to detect one or more additional objects.

18. The method of claim 11, wherein analyzing frames occurring before the first instance comprises analyzing frames occurring up to 10 seconds before the first instance, and wherein analyzing frames occurring after the last instance comprises analyzing frames occurring up to 10 seconds after the last instance.

19. The method of claim 11, wherein analyzing frames occurring before the first instance or frames occurring after the last instance comprises analyzing frames occurring before and after until a head is detected.

20. A system for detecting an object across frames of a video, the system comprising:

a memory; and one or more processors coupled to the memory, the one or more processors configured to:

detect a first group of one or more objects, using a first neural network, in each frame of the video using a first layer of a two-layer detection scheme;

cluster each of the detected one or more objects of the first group in each frame into one or more clustered-object groups;

identify one or more frames of the video missing one of the one or more clustered-object groups; and analyze the identified one or more frames, using an optical image classification engine, to detect a second group of one or more objects in the identified one or more frames using a second layer of the two-layer detection scheme.

* * * * *